United States Patent
Cao et al.

(10) Patent No.: US 9,614,859 B2
(45) Date of Patent: Apr. 4, 2017

(54) LOCATION BASED AUTHENTICATION OF USERS TO A VIRTUAL MACHINE IN A COMPUTER SYSTEM

(71) Applicant: International Business Machines Corporation, Armonk, NY (US)

(72) Inventors: Bin Cao, Rochester, MN (US); Jim C. Chen, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 280 days.

(21) Appl. No.: 14/074,321

(22) Filed: Nov. 7, 2013

(65) Prior Publication Data
US 2015/0128220 A1 May 7, 2015

(51) Int. Cl.
G06F 7/04 (2006.01)
H04L 29/06 (2006.01)

(52) U.S. Cl.
CPC ............ H04L 63/107 (2013.01); H04L 63/08 (2013.01)

(58) Field of Classification Search
CPC .............................. H04L 63/107; H04L 63/08
USPC .............................................. 716/4–6, 14, 15
See application file for complete search history.

(56) References Cited

U.S. PATENT DOCUMENTS

| | | | |
|---|---|---|---|
| 6,795,923 B1 | 9/2004 | Stern et al. | |
| 7,281,130 B2 | 10/2007 | Johnson et al. | |
| 7,457,956 B2 | 11/2008 | Gehrmann | |
| 7,917,750 B2 | 3/2011 | Novoa et al. | |
| 8,204,901 B2 | 6/2012 | Pimpale et al. | |
| 8,352,401 B2 | 1/2013 | Cheng et al. | |
| 8,601,544 B1 * | 12/2013 | Robinson et al. | 726/3 |
| 8,717,401 B1 * | 5/2014 | Gossweiler, III ... H04L 12/1818 348/14.01 |
| 8,831,993 B2 | 9/2014 | Burch et al. | |
| 2008/0301770 A1 * | 12/2008 | Kinder | 726/2 |
| 2011/0296513 A1 * | 12/2011 | Kasad | G06F 21/35 726/9 |
| 2013/0055370 A1 * | 2/2013 | Goldberg | G06F 21/31 726/7 |
| 2013/0179883 A1 | 7/2013 | Hayward et al. | |
| 2013/0283263 A1 * | 10/2013 | Elemary | 718/1 |
| 2013/0326504 A1 * | 12/2013 | Tsirkin et al. | 718/1 |
| 2014/0031011 A1 * | 1/2014 | West | G06F 21/44 455/411 |

OTHER PUBLICATIONS

Toopher App Description, printed Sep. 4, 2013.

* cited by examiner

Primary Examiner — Farid Homayounmehr
Assistant Examiner — Suman Debnath
(74) Attorney, Agent, or Firm — Martin & Associates, LLC; Bret J. Petersen

(57) ABSTRACT

An apparatus and method uses location based authentication of a user accessing a virtual machine (VM) by using the physical location of the virtual machine as a criteria for the authentication. When a user requires a logical partition to run in a known, specified physical location, the user specifies the physical location when the VM is created. The specified physical location is then incorporated into the user authentication process. Users are challenged and must know the physical location in order to be authenticated to the system. When a "disruptive event" in the cloud environment occurs that necessitates moving the VM to another location, the original physical location is stored so the virtualization manager later can automatically relocate the VM back to its original physical location.

20 Claims, 7 Drawing Sheets

LOCATION BASED AUTHENTICATION OF USERS TO A VIRTUAL MACHINE IN A COMPUTER SYSTEM

BACKGROUND

1. Technical Field

This invention generally relates to authentication in computer systems, and more specifically relates to authentication of a user accessing a virtual machine using the physical location of the virtual machine as a criteria for the authentication.

2. Background Art

Cloud computing is a common expression for distributed computing over a network and can also be used with reference to network-based services such as Infrastructure as a Service (IaaS). IaaS is a cloud based service that provides physical processing resources to run virtual machines (VM) as a guest for different customers. The virtual machine may host a user application or a server. Cloud computing and IaaS create a potential opportunity for intruders to access customer data on the virtual machines. Current methods to authenticate to a VM allow opportunities for non-authorized entities to gain access or obtain knowledge of details about the perceived secured connections into that cloud environment. Other security methods for distributed cloud environments require a centralized management system that manages all incoming requests and assigns them accordingly based on authentication. This can compromise the cloud environment if intruders gain access to the central management system.

When a system is deployed to a virtual machine (logical partition), the user typically does not know the physical location of the hardware running the system. If a malicious user gains access to the virtual machine, they could move the virtual machine to a different location to run on their hardware. Because cloud computing provides a level of abstraction that typically hides the location of the physical hardware, a virtual machine could be moved without the end user's knowledge. Some users, especially government entities, require provisioning a logical partition to a specified physical location. However, when the virtual machine is created and running at the specified physical location, the virtual machine could be moved without the user's knowledge.

BRIEF SUMMARY

An apparatus and method for location based authentication of a user accessing a virtual machine (VM) uses the physical location of the virtual machine as a criteria for the authentication. When a user requires a logical partition to run in a known, specified physical location, the user specifies the physical location when the VM is created. The specified physical location is then incorporated into the user authentication process. Users are challenged and must know the physical location in order to be authenticated to the system. When a "disruptive event" in the cloud environment occurs that necessitates moving the VM to another location, the original physical location is stored so the virtualization manager later can automatically relocate the VM back to its original physical location.

The foregoing and other features and advantages of the invention will be apparent from the following more particular description of preferred embodiments of the invention, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

DETAILED DESCRIPTION

Figure 1:
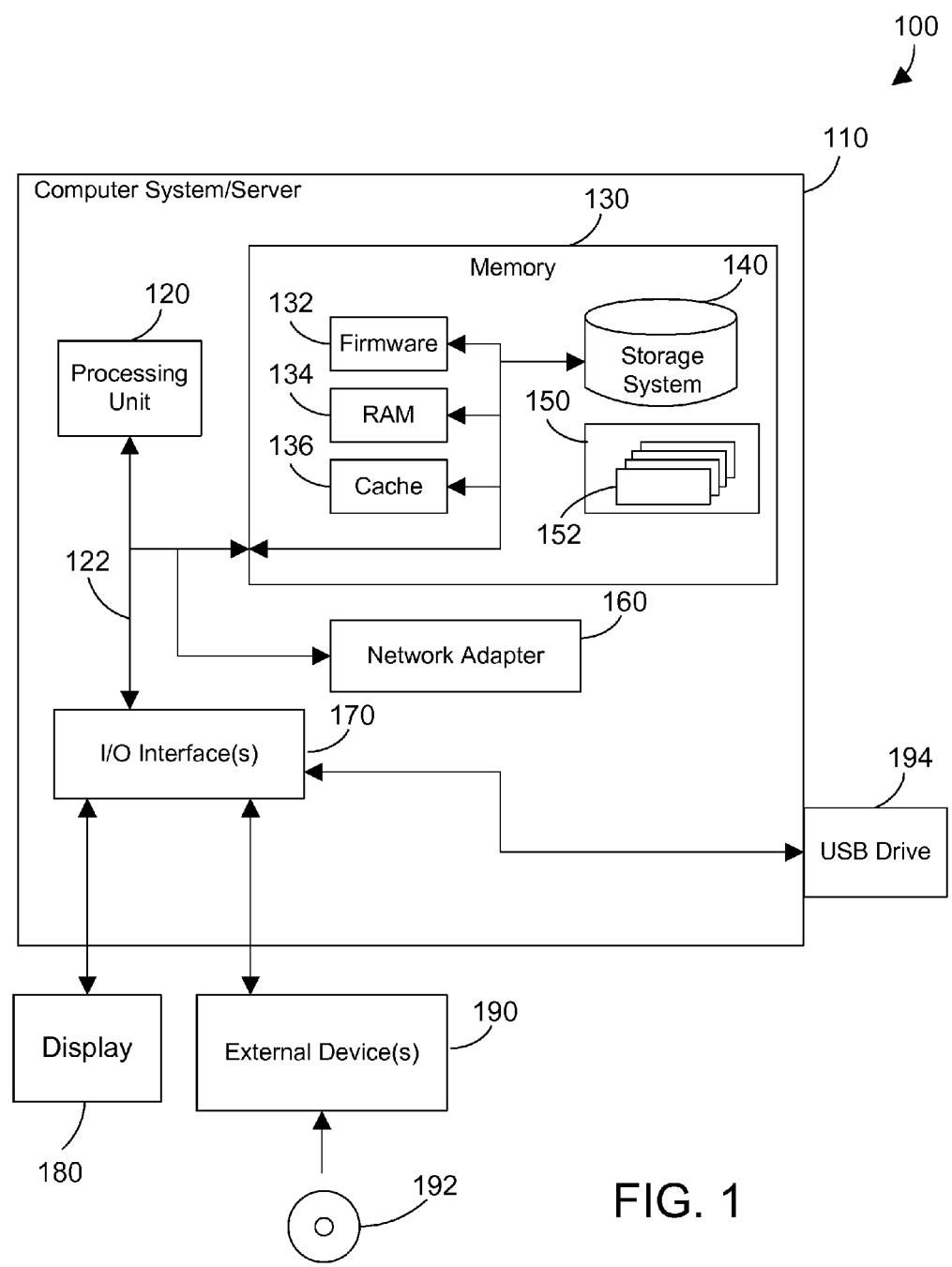
FIG. 1 is a block diagram of a cloud computing node.

The claims and disclosure herein provide mechanisms and methods for location based authentication of a user accessing a virtual machine (VM) by using the physical location of the virtual machine as a criteria for the authentication. When a user requires a logical partition to run in a known, specified physical location, the user specifies the physical location when the VM is created. The specified physical location is then incorporated into the user authentication process. Users are challenged and must know the physical location in order to be authenticated to the system. When a "disruptive event" in the cloud environment occurs that necessitates moving the VM to another location, the original physical location is stored so the virtualization manager later can automatically relocate the VM back to its original physical location.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a block diagram of an example of a cloud computing node is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/server 110, which is operational with numerous other general purpose or special purpose computing system environments or configurations. Examples of well-known computing systems, environments, and/or configurations that may be suitable for use with computer system/server 110 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 110 may be described in the general context of computer system executable instructions, such as program modules, being executed by a computer system. Generally, program modules may include routines, programs, objects, components, logic, data structures, and so on that perform particular tasks or implement particular abstract data types. Computer system/server 110 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 110 in cloud computing node 100 is shown in the form of a general-purpose computing device. The components of computer system/server 110 may include, but are not limited to, one or more processors or processing units 120, a system memory 130, and a bus 122 that couples various system components including system memory 130 to processing unit 120.

Bus 122 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 110 typically includes a variety of computer system readable media. Such media may be any available media that is accessible by computer system/server 110, and it includes both volatile and non-volatile media, removable and non-removable media. Examples of removable media are shown in FIG. 1 to include a Digital Video Disc (DVD) 192 and a USB drive 194.

System memory 130 can include computer system readable media in the form of volatile or non-volatile memory, such as firmware 132. Firmware 132 provides an interface to the hardware of computer system/server 110. System memory 130 can also include computer system readable media in the form of volatile memory, such as random access memory (RAM) 134 and/or cache memory 136. Computer system/server 110 may further include other removable/non-removable, volatile/non-volatile computer system storage media. By way of example only, storage system 140 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 122 by one or more data media interfaces. As will be further depicted and described below, memory 130 may include at least one program product having a set (e.g., at least one) of program modules that are configured to carry out the functions described in more detail below.

Program/utility 150, having a set (at least one) of program modules 152, may be stored in memory 130 by way of example, and not limitation, as well as an operating system, one or more application programs, other program modules, and program data. Each of the operating system, one or more application programs, other program modules, and program data or some combination thereof, may include an implementation of a networking environment. Program modules 152 generally carry out the functions and/or methodologies of embodiments of the invention as described herein.

Computer system/server 110 may also communicate with one or more external devices 190 such as a keyboard, a pointing device, a display 180, a disk drive, etc.; one or more devices that enable a user to interact with computer system/server 110; and/or any devices (e.g., network card, modem, etc.) that enable computer system/server 110 to communicate with one or more other computing devices. One suitable example of an external device 190 is a DVD drive which can read a DVD 192 as shown in FIG. 1. Such communication can occur via Input/Output (I/O) interfaces 170. Still yet, computer system/server 110 can communicate with one or more networks such as a local area network (LAN), a general wide area network (WAN), and/or a public network (e.g., the Internet) via network adapter 160. As depicted, network adapter 160 communicates with the other components of computer system/server 110 via bus 122. It should be understood that although not shown, other hardware and/or software components could be used in conjunction with computer system/server 110. Examples, include, but are not limited to: microcode, device drivers, redundant processing units, external disk drive arrays, Redundant Array of Independent Disk (RAID) systems, tape drives, data archival storage systems, etc.

Figure 2:
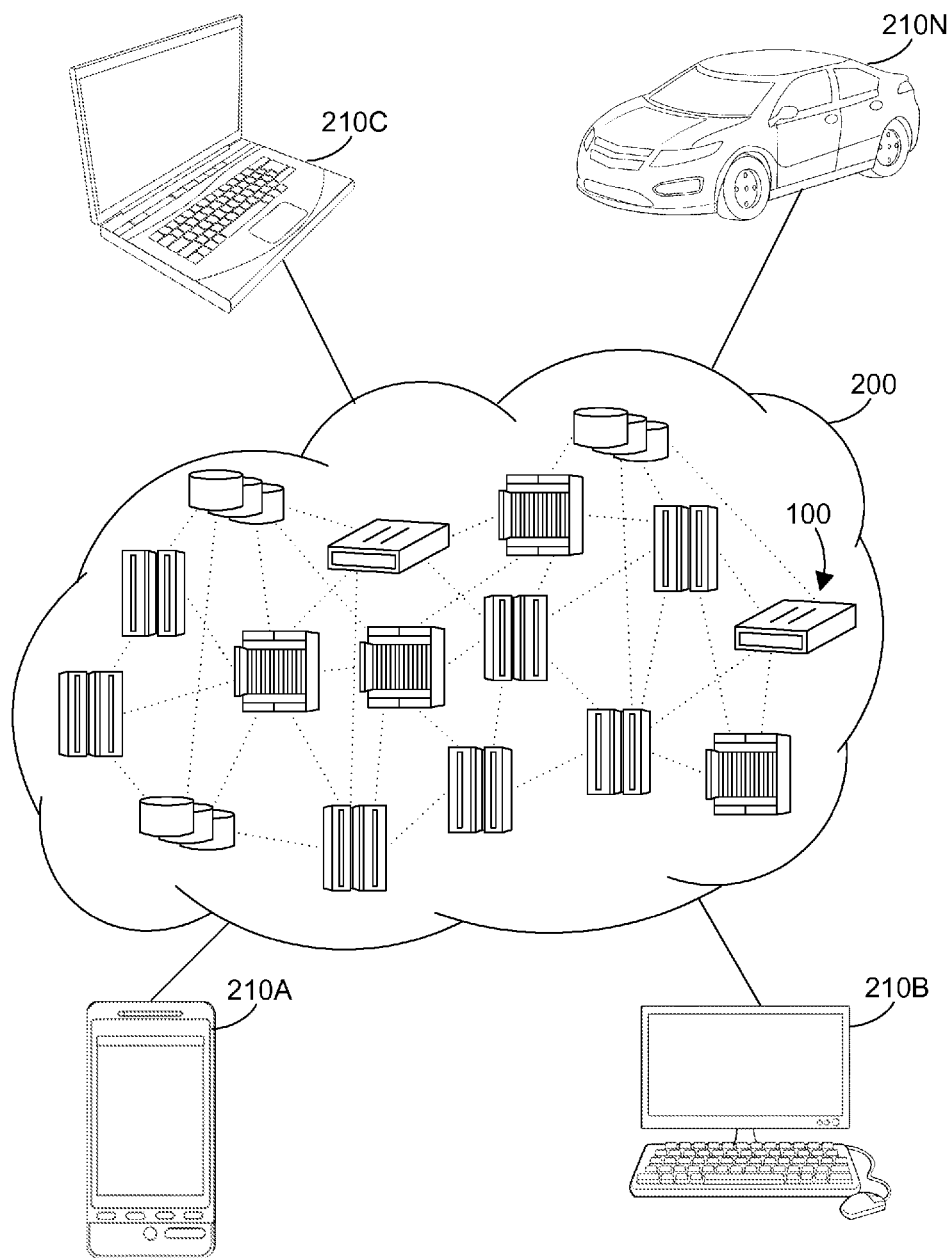
FIG. 2 is a block diagram of a cloud computing environment.

Referring now to FIG. 2, illustrative cloud computing environment 200 is depicted. As shown, cloud computing environment 200 comprises one or more cloud computing nodes 100 with which local computing devices used by cloud consumers, such as, for example, personal digital assistant (PDA) or cellular telephone 210A, desktop computer 210B, laptop computer 210C, and/or automobile computer system 210N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 210A-N shown in FIG. 2 are intended to be illustrative only and that computing nodes 100 and cloud computing environment 200 can communicate with any type of computerized device over any type of network and/or network addressable connection (e.g., using a web browser).

Figure 3:
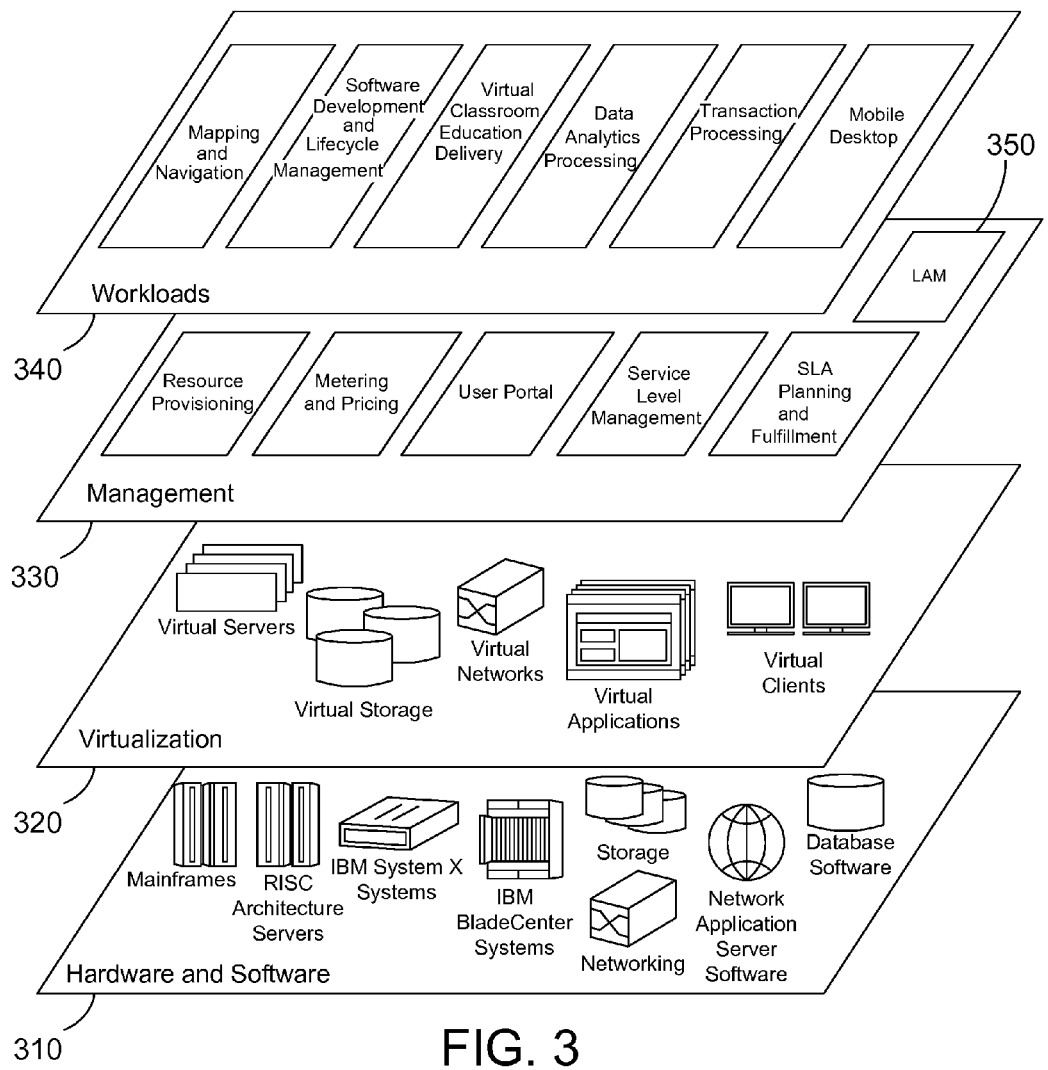
FIG. 3 is a block diagram of abstraction model layers.

Referring now to FIG. 3, a set of functional abstraction layers provided by cloud computing environment 200 in FIG. 2 is shown. It should be understood in advance that the components, layers, and functions shown in FIG. 3 are intended to be illustrative only and the disclosure and claims are not limited thereto. As depicted, the following layers and corresponding functions are provided.

Hardware and software layer 310 includes hardware and software components. Examples of hardware components include mainframes, in one example IBM System z systems; RISC (Reduced Instruction Set Computer) architecture based servers, in one example IBM System p systems; IBM System x systems; IBM BladeCenter systems; storage devices; networks and networking components. Examples of software components include network application server software, in one example IBM WebSphere® application server software; and database software, in one example IBM DB2® database software. IBM, System z, System p, System x, BladeCenter, WebSphere, and DB2 are trademarks of International Business Machines Corporation registered in many jurisdictions worldwide.

Virtualization layer 320 provides an abstraction layer from which the following examples of virtual entities may be provided: virtual servers; virtual storage; virtual networks, including virtual private networks; virtual applications and operating systems; and virtual clients.

In one example, management layer 330 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. The management layer further includes a location authentication mechanism (LAM) 350 as described herein. While the LAM 350 is shown in FIG. 3 to reside in the management layer 330, LAM 350 actually may span other levels shown in FIG. 3 as needed.

Workloads layer 340 provides examples of functionality for which the cloud computing environment may be utilized. Examples of workloads and functions which may be provided from this layer include: mapping and navigation;

software development and lifecycle management; virtual classroom education delivery; data analytics processing; transaction processing and mobile desktop.

As will be appreciated by one skilled in the art, aspects of this disclosure may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
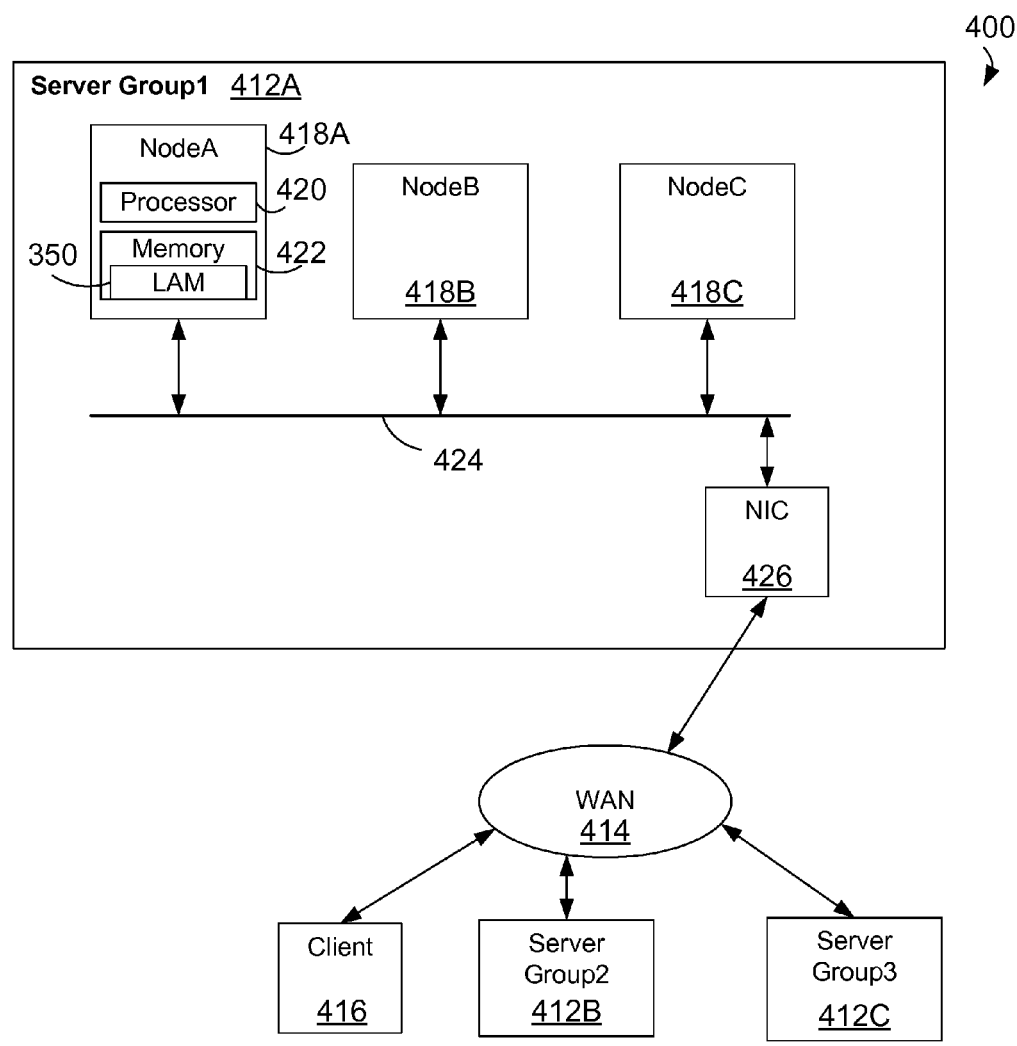
FIG. 4 is a block diagram of an example networked computer system incorporating a location authentication mechanism as described herein.

Referring now to FIG. 4, a block diagram presents an example networked computer system incorporating a location authentication mechanism (LAM) 350 as described herein. The node hosting the LAM 350 may be a stand-alone server such as server 110 shown in FIG. 1. Alternatively, the node hosting the LAM 350 may be a computing node 418A that is part of a server group 412 as shown in FIG. 4. The detailed description herein will focus on this latter configuration but it is understood that the LAM could be implemented in any networked server architecture. The computer system 400 includes a number of server groups 412A-412C connected via a wide area network (WAN) 414, which may be an Internet-connected network or other network. The server groups 412 represent computers that provide cloud computing resources such as host servers, storage and virtual machines to customers (users). A server group could represent a blade center system as shown in the hardware 310 of FIG. 3. One or more clients or user workstation terminals 416 are also shown as coupled to WAN 114 to provide user access to the networked computer system.

Server group1 412A in FIG. 4 shows additional details and could be representative of each of the server groups 112. The Server group1 412A may be housed in one or more computer racks at a particular provider's location. Server Group1 412A includes a plurality of computing nodes 418 (418A-418C). The computing nodes 418 may include all the characteristics of a cloud computing node 100 shown in FIG. 1. The computing nodes 418 each include at least one processor 420 and system memory 422. The computing node 418A is connected to other computing nodes 418B, 418C by a local bus 424, and also to other computing nodes on other server groups coupled through WAN 414 via a network interface controller (NIC) 426. Program instructions forming storage manager objects, services or programs, including the LAM 350 as described herein generally reside in memory 422 and are executed by one or more of computing nodes 418 to provide control of virtual storage within the networked computer system. While the LAM 350 is shown to reside in the memory of NodeA 418A, portions of the LAM may reside in other locations as needed. The LAM is described in more detail below.

Network interface card 426 is used to connect other computer systems and/or workstations (e.g., client 416 in FIG. 4) to computer system 400 across a WAN 414. The present invention applies equally no matter how computer system 400 may be connected to other computer systems and/or workstations, regardless of whether the network connection is made using present-day analog and/or digital techniques or via some networking mechanism of the future. In addition, many different network protocols can be used to implement a network. These protocols are specialized computer programs that allow computers to communicate across network 414. TCP/IP (Transmission Control Protocol/Internet Protocol) is an example of a suitable network protocol.

The networked computer system of FIG. 4 is only an example of a physical computer system in which virtualized operation of multiple operating system images is practical and is supported by the hardware configuration. However it is understood that techniques in accordance with the present invention as described in further detail below can be implemented in a variety of computer systems, both larger and smaller scaled.

Figure 5:
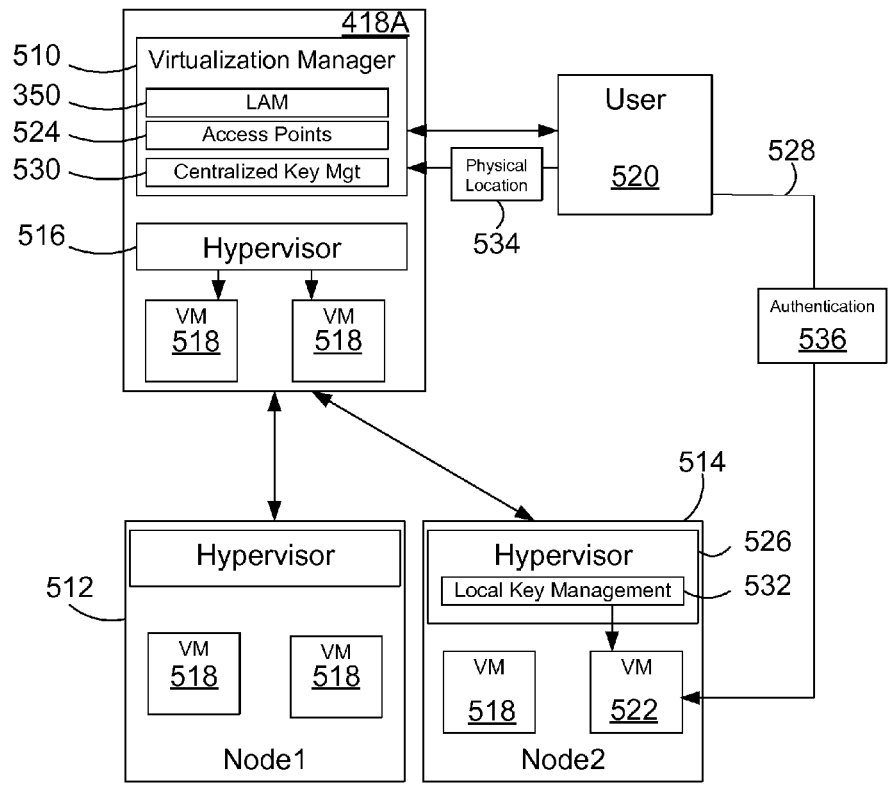
FIG. 5 is a block diagram that illustrates a virtualization manager with a location authentication mechanism that provides location based authentication for the computer system in FIG. 1.

FIG. 5 is a block diagram that illustrates a virtualization manager 510 with a location authentication mechanism 350 that provides location based authentication for the computer system 400 in FIG. 4. In FIG. 5, NodeA 418A is shown connected to two other nodes 512, 514. Node 512 represents a node in server group2 412B and node 514 represents a node in server group3 412C shown in FIG. 4. Each node 418A, 512, 514 has a hypervisor 516 and one or more virtual machines 518. The hypervisor 516 is software, firmware or hardware that creates and runs virtual machines and may incorporate the functions of the virtualization layer 320 in FIG. 3. As introduced above, the LAM 350 is typically implemented as a process in one or more of the compute nodes 418. In this example, the LAM 350 is incorporated into the virtualization manager 510. The virtualization manager 510 includes functions similar to virtualization managers known in the prior art, but additionally includes other functions described below that are not know in the prior art. As used herein, the virtualization manager 510 manages the distribution of virtual machines 518 to the various hypervisors 516 and may implement all the functions of the management layer 330 in FIG. 3. The virtualization manager 510 is a controller node that manages the other compute nodes in the cloud environment. The virtualization manager 510 may also include access points 524 for storing the location of a virtual machine and a centralized key management system 530 as described further below.

Again referring to FIG. 5, a user 520 requests the virtualization manager 510 to create and provision a VM 522 in a manner similar to the prior art. In a first example, the virtualization manager 510 then allows the user 520 to specify the physical location 534 of the VM 522. In FIG. 5, the user 520 has selected to place a VM 522 into the host or node2 514. Alternatively, if the user does not specify a location, the virtualization manager chooses the physical location and provides the physical location to the user (also assumed for illustration to be node2 514). When the VM 522 is provisioned in node2 514, an access point 524 is created and mapped to the physical location by the hypervisor 526. Access points 524 are preferably stored in the virtualization manager or the hypervisor as described further below. These access points are then used to authenticate a user to gain access to a VM. The user gains access to the VM 522 by providing the correct physical location for the access point that indicates where VM 522 physically resides. When a user tries to access the VM 522, if the user uses an incorrect access point, one that is not mapped to that VM then an alert is initiated. The alert may include a notification to the owner of the VM 522 such as the system administrator that there was a possible attempted intrusion to gain access to the VM, the node or the entire cloud system. The alert may also include logging the attempt by the LAM 350. If the user provides the correct physical location stored in the access points for the desired VM, then the user is allowed to authenticate with the VM.

The access points described herein can be implemented in various ways. In a first example, the authentication of the user is tied to a centralized key management system 530 supported on the management system level in the virtualization manager 418A as shown in FIG. 5. In this example, the LAM 350 and the access points 524 would preferably also reside in the virtualization manager 418A. The location of the VM stored in the access point is used in conjunction with authentication credentials by the centralized key management system. The authentication essentially becomes a two-pronged process. First, the user uses the physical location 534 of the VM as a key to access the VM. The LAM 350 in the virtualization manager 510 uses the physical location to compare to the access points to initially authenticate the user. Second, the user authenticates to the VM using conventional authentication credentials. This second part can be done using commercially available third party security software. In this example, the user will connect to the management system and then use the physical location of the VM as a key. The LAM 350 uses the provided physical location 534 to determine a match of the physical locations of virtual machines stored in the access points 524. When the proper physical address is provided by the user, the management system then routes authentication exchange information 536 from the user to the VM so the user can authenticate to the VM in a conventional manner. Thus, while the VM does not know its physical location, the user knowing the physical location stored in the access points can locate the VM and authenticate with the key credentials stored in the template of the VM image prior to the VM creation and deployment.

In another example, access points are supported locally on the compute node where the VM physically resides. In this alternate example, location based authentication of a user is tied to a local key management system 532 shown in FIG. 5. In this example, it may be preferable that the access points and all or part of the LAM 350 described above also be located in the hypervisor 526 of the local computing node 514. The location of the VM and the authentication credentials can be mapped as a key pair by the local management system. The same two prong process described above can be used here. The user connects to the specific compute node using the physical location and then authenticates to the VM as described above.

Figure 6:
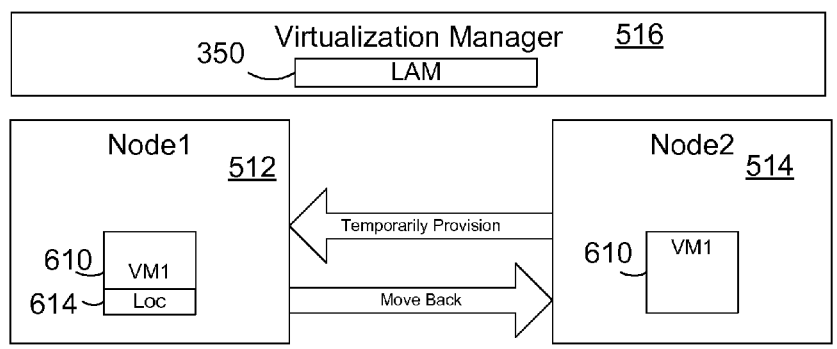
FIG. 6 is a block diagram that illustrates movement of a virtual machine to another location and then returning it to the original location.

FIG. 6 is a block diagram to illustrate movement of a virtual machine to another location and then returning it to the original location. Movement of resources in a cloud environment is often needed for balancing efficiency and performance and may also be need for maintenance or failure. Movement of the resource is taken into account by the LAM 350 and the virtualization manager 514. If the real time environment requires a movement of resources such as a VM that is tied to a specific location, the hypervisor executes the movement of resources in conjunction with the LAM. The hypervisor may then return the VM to the original specified location to maintain the validity of the location for the next authentication session. In FIG. 6, the LAM 350 temporarily provisions VM1 610 from node2 514 to node1 512. The LAM 350 stores a home location 614 that points to or indicates the original physical location know to the user. In this example, the home location 614 is stored with the data of the VM1 610 in the new location. Alternatively the home location could be stored in the hypervisor in conjunction with the access points that shows the physical location of current VMs in the node. The LAM 350 can then use this location to move the VM1 610 back to the original location. When the virtualization manager 514 moves the VM, the LAM notifies the user of the new physical location so the user can authenticate to the VM at the new location as described further with reference to FIG. 8.

Some environments incorporate password management cycles that require users to periodically renew passwords. For location authentication, the owner of a VM can retain the same password credentials but move the physical location of the VM using the authentication procedure in the same manner as when the VM is created as described herein. In the event of a possible intrusion or attack on a VM, the VM will be migrated by the virtualization manager and the owner is notified of the new location of the VM for subsequent authentication by the owner/user.

Figure 7:
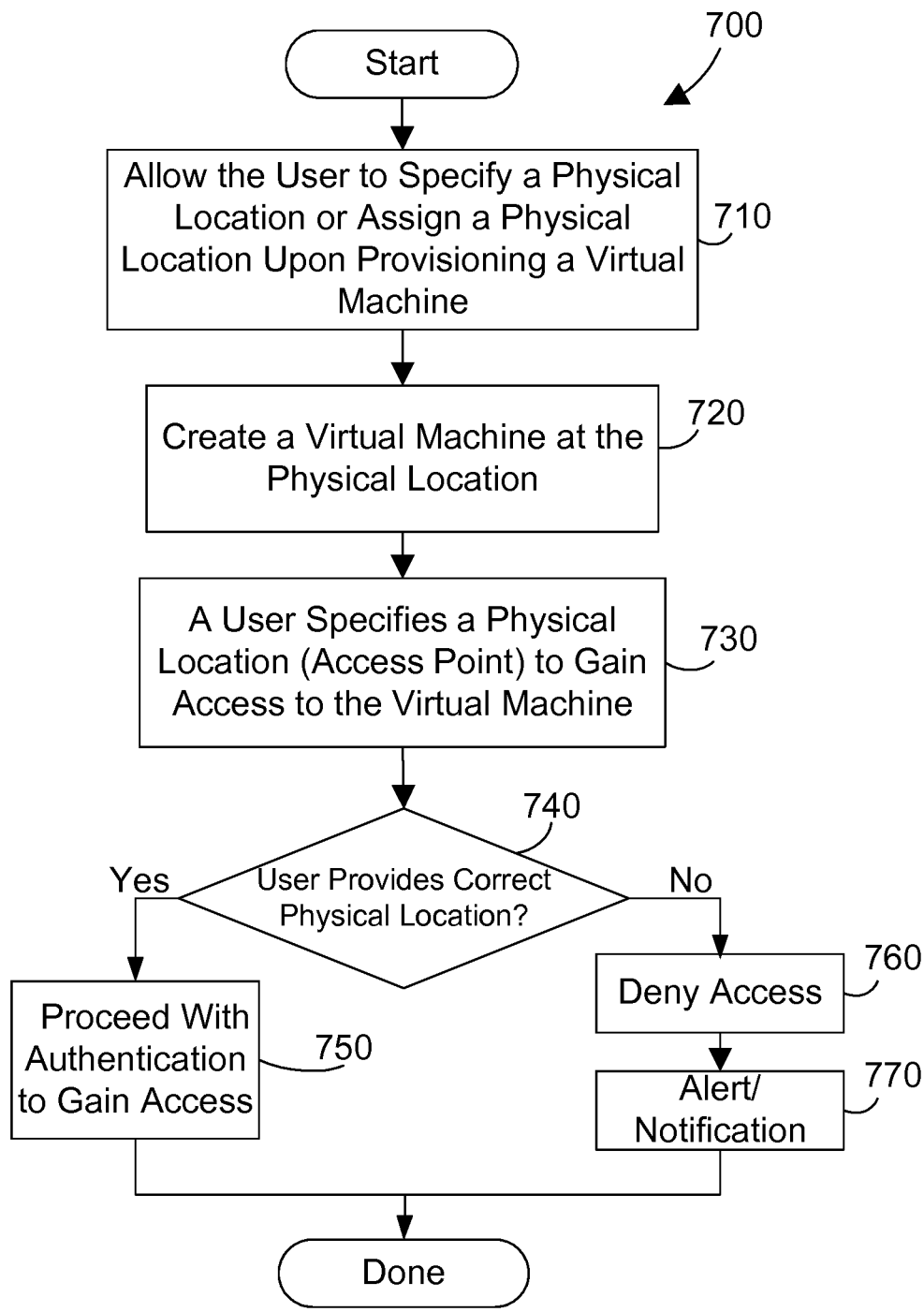
FIG. 7 is a flow diagram of a method for a location authentication mechanism that provides location based authentication as described and claimed herein.

Referring now to FIG. 7, a flow diagram shows method 700 for a location authentication mechanism that provides location based authentication as described and claimed herein. The method 700 is presented as a series of steps performed by a computer software program described above as the location authentication mechanism 350. Determine a physical location by allowing a user to specify the physical location or assign a physical location upon provisioning a virtual machine (step 710). Create a virtual machine at the physical location (step 720). The user specifies a physical location to gain access to the VM (step 730). If the user specified physical location is correct (step 740=yes) then allow the user to proceed with authentication to gain access the physical location (step 750). If the user specified physical location is not correct (step 740=no) then deny access to the physical location (step 760) and initiate an alert to the system and/or notify a system administrator or user (step 770). The method is then done.

Figure 8:
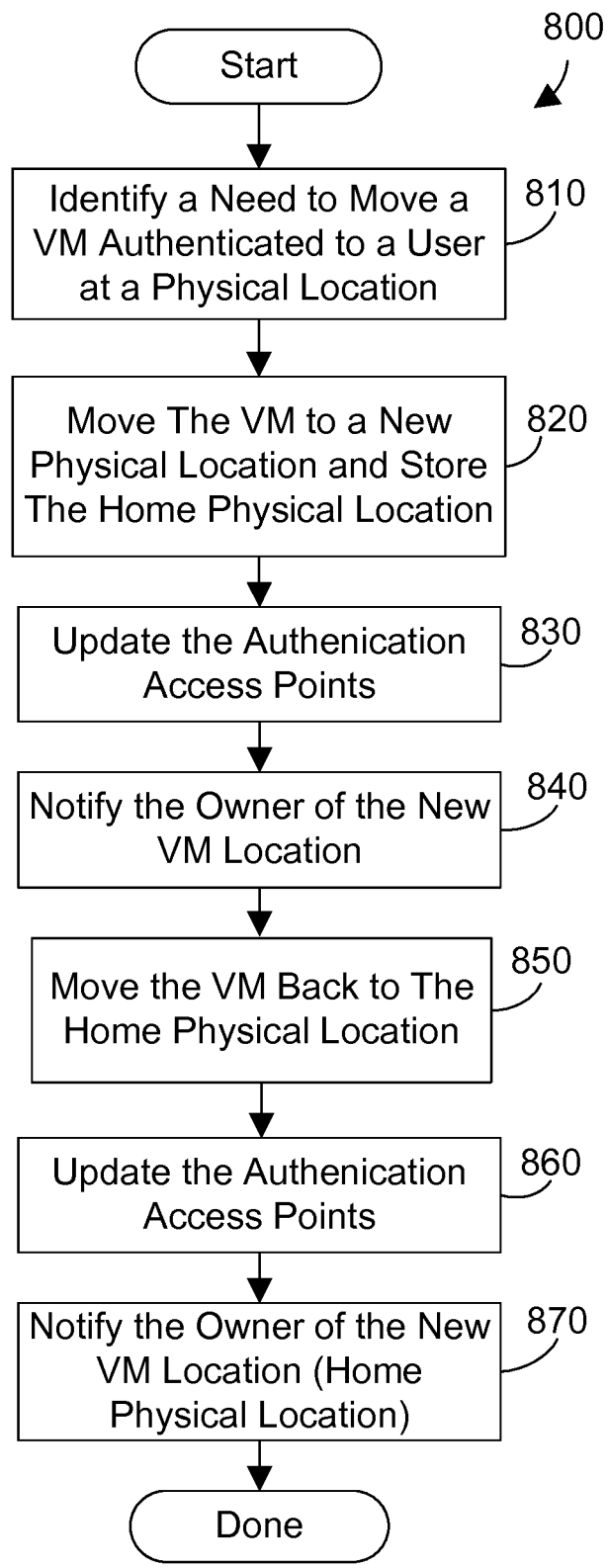
FIG. 8 is a flow diagram of a method for temporarily moving a virtual machine as described and claimed herein.

Referring now to FIG. 8, a flow diagram shows method 800 for a location authentication mechanism that provides location based authentication as described and claimed herein by temporarily moving a virtual machine. The method 800 is presented as a series of steps performed by a computer software program described above as the location authentication mechanism 350. Identify a need to move a VM authenticated to a user at a physical (home) location (step 810). Move the VM to a new physical location and store the home physical location (step 820). Update the authentication access points (step 830). Notify the owner of the VM's new physical location (step 840). Move the VM back to the home physical location (step 850). Update the authentication access points (step 860). Notify the owner of the VM's new physical location (now back at the home physical location) (step 870). The method is then done.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The claims and disclosure herein provide an apparatus and method for location based authentication of a user accessing a virtual machine (VM) using the physical location of the virtual machine as a criteria for the authentication. When a user requires a logical partition to run in a known, specified physical location, the user specifies the physical location when the VM is created. The specified physical location is then incorporated into the user authentication process. Location based authentication as described herein helps insure the virtual machine will not be moved without the user's knowledge to increases the security of the system.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus comprising:
   a plurality of computer nodes having at least one processor and a memory;
   a virtualization manager that provisions virtual machines on the plurality of compute nodes to provide resources to a user; and
   a location authentication mechanism that provides location based authentication to access a virtual machine by the user, where location based authentication requires the user during authentication to provide a physical location of the virtual machine that was determined by allowing the user to specify the physical location at a time when the virtual machine was created and provisioned by the virtualization manager.

2. The apparatus of claim 1 further comprising access points that point to the physical location of the virtual machine, wherein the access points are used by the location authentication mechanism to compare to the physical location provided by the user to authenticate the user.

3. The apparatus of claim 2 wherein the location authentication mechanism further authenticates the user to the virtual machine by requiring the user to provide a key to authenticate to the virtual machine.

4. The apparatus of claim 3 wherein the location authentication mechanism further authenticates the user to the virtual machine using a centralized key management system located in the virtualization manager.

5. The apparatus of claim 3 wherein the location authentication mechanism further authenticates the user to the virtual machine using a local key management system located in a partition manager associated with the virtual machine.

6. The apparatus of claim 1 wherein the virtualization manager temporarily moves the virtual machine to a new physical location, stores a home location pointing to the physical location determined when the virtual machine was created and then moves the virtual machine back to the home location.

7. The apparatus of claim 6 wherein the home location is stored in the virtual machine in the new location.

8. The apparatus of claim 1 wherein the user specifies the physical location for the virtual machine when the virtual machine is provisioned.

9. The apparatus of claim 1 wherein the physical location for the virtual machine is assigned by the virtualization manager when the virtual machine is provisioned.

10. An apparatus comprising: a plurality of compute nodes each having at least one processor and a memory;
   a virtualization manager that provisions virtual machines on the plurality of compute nodes to provide resources to a user;
   a location authentication mechanism that provides location based authentication to access a virtual machine by a user, where location based authentication requires the user to provide during authentication a physical location of the virtual machine that was determined by allowing the user to specify the physical location at a time when the virtual machine was created and provisioned by the virtualization manager where the physical location specifies the physical host for placing the virtual machine;
   access points that point to the physical location of the virtual machine, wherein the access points are used by the location authentication mechanism to compare to the physical location provided by the user to initially authenticate the user;
   wherein the location authentication mechanism further authenticates the user to the virtual machine by requiring the user to provide a key to authenticate to the virtual machine; and
   wherein the user specifies the physical location for the virtual machine when the virtual machine is provisioned; and
   wherein the virtualization manager temporarily moves the virtual machine to a new physical location, stores a home location pointing to the physical location determined when the virtual machine was created, notifies the user of the new physical location, and then moves the virtual machine back to the home location.

11. The apparatus of claim 10 wherein the location authentication mechanism stores the home location with the virtual machine.

12. An apparatus comprising:
   a plurality of compute nodes having at least one processor and a memory;
   a virtualization manager that provisions virtual machines on the plurality of compute nodes to provide resources to a user; and
   a location authentication mechanism that provides location based authentication to access a virtual machine by the user, where location based authentication requires the user during authentication to provide a physical location of the virtual machine that was determined by allowing the user to specify the physical location at a time when the virtual machine was created and provisioned by the virtualization manager where the physical location specifies the physical host for placing the virtual machine.

13. The apparatus of claim 12 further comprising access points that point to the physical location of the virtual machine, wherein the access points are used by the location authentication mechanism to compare to the physical location provided by the user to authenticate the user.

14. The apparatus of claim 13 wherein the location authentication mechanism further authenticates the user to the virtual machine by requiring the user to provide a key to authenticate to the virtual machine.

15. The apparatus of claim 14 wherein the location authentication mechanism further authenticates the user to the virtual machine using a centralized key management system located in the virtualization manager.

16. The apparatus of claim 14 wherein the location authentication mechanism further authenticates the user to the virtual machine using a local key management system located in a partition manager associated with the virtual machine.

17. The apparatus of claim 12 wherein the virtualization manager temporarily moves the virtual machine to a new physical location, stores a home location pointing to the physical location determined when the virtual machine was created and then moves the virtual machine back to the home location.

18. The apparatus of claim 17 wherein the home location is stored in the virtual machine in the new location.

19. The apparatus of claim 12 wherein the user specifies the physical location for the virtual machine when the virtual machine is provisioned.

20. The apparatus of claim 12 wherein the physical location for the virtual machine is assigned by the virtualization manager when the virtual machine is provisioned.

* * * * *